Figure 1:
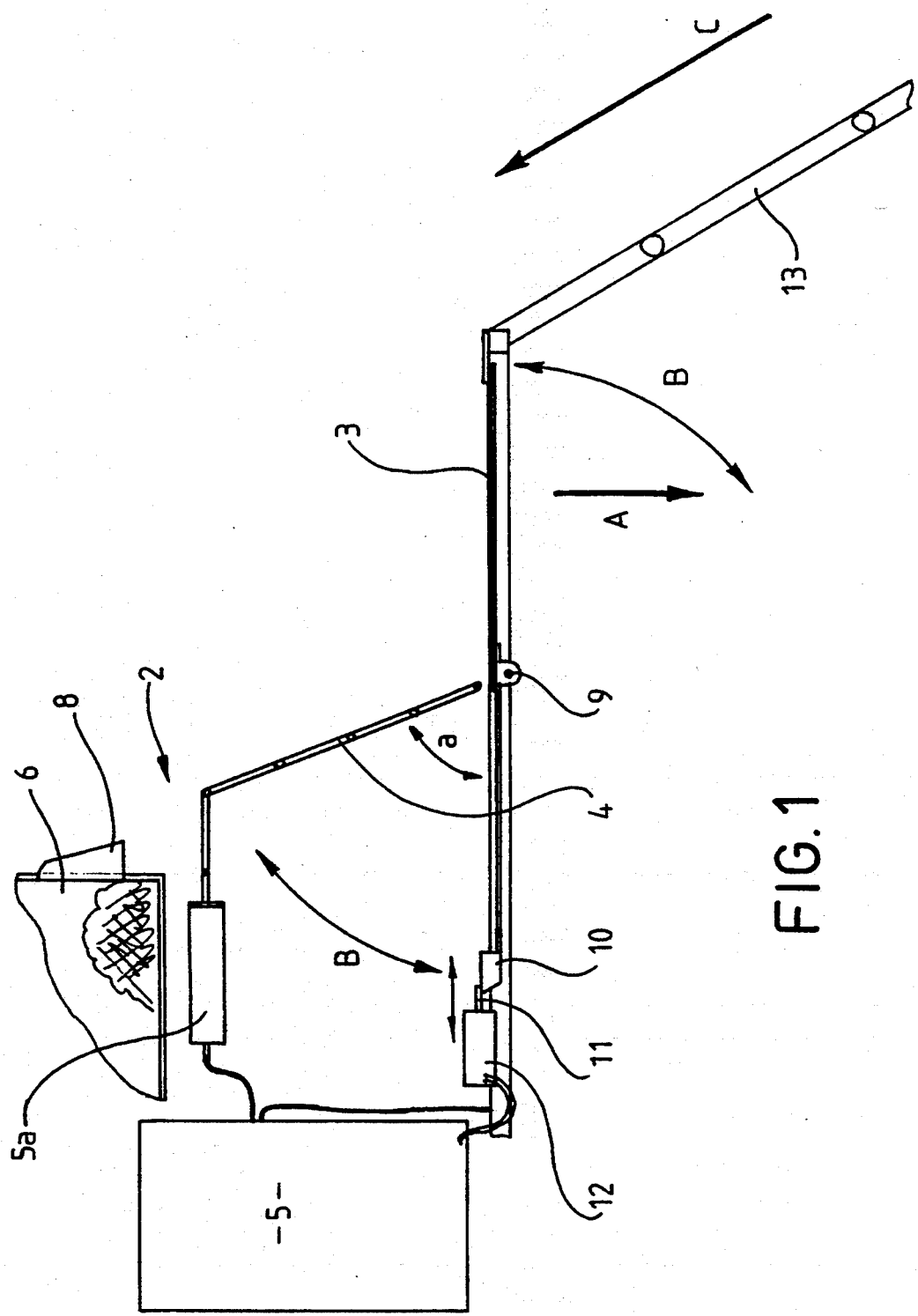

United States Patent [19]

Allen

[11] Patent Number: 5,406,742
[45] Date of Patent: Apr. 18, 1995

[54] ANIMAL TRAP

[76] Inventor: Mervyn C. Allen, c/o S. R. Dakin, Rhodes Road, Tai Tapu, New Zealand

[21] Appl. No.: 104,641

[22] Filed: Aug. 11, 1993

[30] Foreign Application Priority Data

Aug. 12, 1992 [NZ] New Zealand .......................... 243915

[51] Int. Cl.6 ............................................ A01M 23/38
[52] U.S. Cl. .......................................................... 43/98
[58] Field of Search ............................................... 43/98

[56] References Cited

U.S. PATENT DOCUMENTS

| 1,075,995 | 10/1913 | Smith | 43/98 |
| 1,080,529 | 12/1913 | Bailey | 43/98 |
| 2,098,884 | 11/1937 | Rousseau | 43/98 |
| 2,229,300 | 1/1941 | Montroy | 43/98 |

FOREIGN PATENT DOCUMENTS

| 730778 | 5/1932 | France | 43/98 |
| 618477 | 8/1935 | Germany | 43/98 |

Primary Examiner—Kurt Rowan
Attorney, Agent, or Firm—Ross, Ross & Flavin

[57] ABSTRACT

Animal trap which provides an electrically conductive base plate, an animal attractant substance supported above the base plate and an electrically conductive ladder or similar means arranged between the animal attractant and the base plate, but not electrically connected to the base plate; a power source capable of generating electric current is connected to the ladder and is arranged to release an electric current of sufficient strength to kill the animal when the animal is touching both the base plate and the ladder.

3 Claims, 2 Drawing Sheets

ANIMAL TRAP

The present invention relates to a trap capable of attracting and killing a number of different types of animals or pests.

There are an enormous number of methods of trapping undesirable animals, and devices embodying these methods. However the number of successful traps which are capable of being left to operate remotely and repeatedly, without attention, are few.

An object of the present invention is the provision of a trap which can be repeatedly used to trap and kill a particular predetermined species of animal without human intervention. It is also an object of the present invention to provide a trap which is capable of being left to operate repeatedly without the need for supervision or maintenance, except on a periodic basis. A further object of the invention is the provision of a trap which fulfils the above objects in any conditions of climate and setting. A still further object of the invention is the provision of a trap that kills quickly and cleanly.

The present invention provides an animal trap which includes: means to attract an animal to be trapped into said trap; a first component capable of conducting an electric current; a second component capable of conducting an electric current and not electrically connected to said first component, said second component being at an angle relative to the first component; said first and second components both including means capable of being contacted by said animal; control means to cause an electric current to be transmitted through one of said first or said second components while said first and second components are being touched by said animal, the other of said first or second components being earthed; and a power source capable of generating said electric current; wherein said electric current is of sufficient strength to kill said animal.

Preferably, the electric current is passed through said second component for a predetermined time and after a pre-selected period of time, after said animal has touched said second component. Preferably, said power source is of a size that the electric current can be repeatedly generated for said predetermined time.

Preferably also said trap further includes means to remove the body of the trapped animal from said trap. Also the trap preferably includes a housing to protect said trap from inclement weather conditions, whilst not reducing the accessability of the trap to animals.

Figure 2:
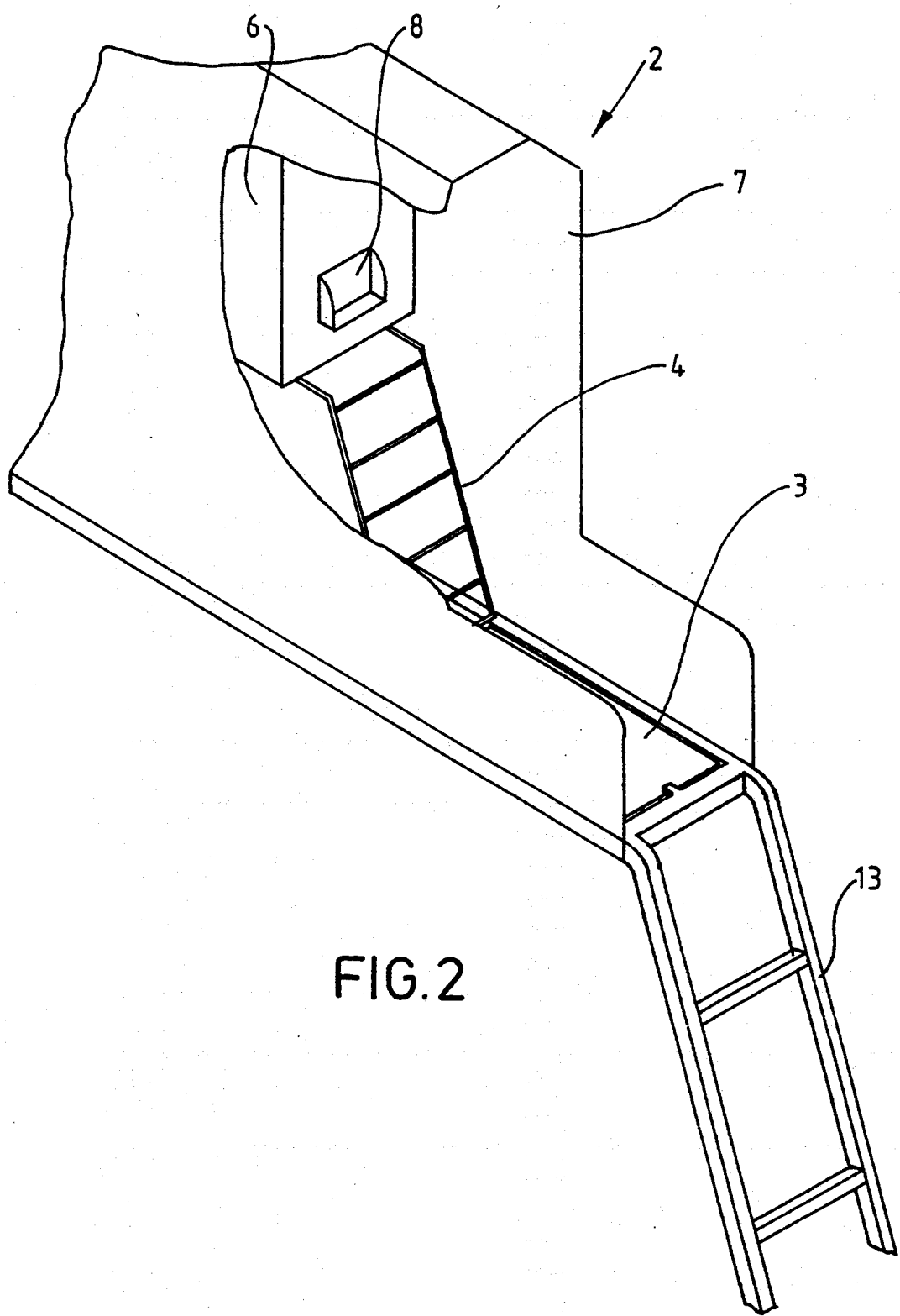

By way of example only a preferred embodiment of the present invention will be described in detail with reference to trapping a possum and to the accompanying drawings, in which:

FIG. 1 is a sectional view of the present invention without any housing present; and FIG. 2 is an isometric view of the present invention, with one side of the housing partially cut away.

Referring to the drawings, a trap 2 includes a base 3, an angled ladder 4, a control box 5, a food container 6 and a housing 7 (FIG. 2 only).

The ladder 4 is set at an acute angle a to the back of the base 3. In practice it has been found that the best range of angles for angle a is between 35° and 75°. If the angle is any steeper than this a possum will not rest its front paws on the ladder 4 or grip/use the rungs of the ladder 4. If the angle a is any shallower than this, once the possum is dead it remains resting on the ladder 4 and cannot be automatically removed from the base 3. Thus the angle a of the ladder 4 or the rungs, relative to the base 3, is dependent on fulfilling these requirements.

The ladder 4 is secured rigidly at its upper end within the trap 2 and does not touch the base 3. Also attached to the ladder 4 is a known means 5a for sensing movement of or weight on the ladder 4. The base 3 acts as the earth for the trap 2.

The ladder 4 has been described as such, although it will be appreciated that any device with means which can be contacted or gripped by a possum when tasting the food used as an attractant is equally suitable.

The food container 6 is positioned adjacent the upper end of the ladder 4. The food container 6 has an opening 8 through which the possum has access to the food and through which the food can also be loaded into the container 6.

If so desired, the food container 6 (or food) may be replaced by any other suitable attractant that is capable of acting as an attractant for a possum over a long period of time (e.g. for up to one month). In the case of possums such food could be a paste of cinnamon, pollard and flour. Alternatively, some animals will investigate a white rag, or a rag impregnated with an attracting smell.

The height of the food container 6 above the base 3 depends upon the size of the animal to be killed: the height must be such that an animal can stand comfortably on the base 3 and reach the container 6 with its head, contacting the ladder 4 as it does so. Thus, when current is passed through the ladder, it earths to the base 3 through the animal. For a possum, the container 6 typically is approximately 220 mm above the base 3.

The control box 5 includes a power source (not shown) such as a known type of battery, e.g. a 12 volt battery. This is connected, with known circuitry, with the sensing means 5a and the ladder 4. Known circuitry is used to enable a current to be passed through the ladder 4 for thirty seconds after a possum has been gripping or resting on the ladder 4 for ten seconds. The current is 250 volts peak to peak and at five amps. The length of time the current is passed through the ladder 4 and the strength of the current will vary depending on the animal to be trapped and killed.

Given the example of a possum and a standard 12 volt battery, 400 such bursts of current can be passed through the ladder 4 before the battery needs recharging or replacing. Obviously other types of battery may be used if so desired. Also, if so desired, with appropriate known circuitry, the trap 2 could be powered from mains power.

Alternatively the electric circuit can be reversed:, the base 3 can be electrically insulated from earth, the ladder 4 earthed, and the current passed through the base 3 to earth through the animal and ladder 4.

The base 3 is pivotable about a fixed point 9 and includes a counterweight 10 on the second side of the pivot point 9. The counterweight 10 is held in a closed position (as shown in FIG. 1) by a mechanical stop 11. A solenoid 12 and suitable electrical circuitry is used to release the counterweight 10 one minute after the control box 5 generates a current through the ladder 4. This causes the base 3 to tip downwards (arrow B, FIG. 1). The housing 7 (FIG. 2) on the sides of the trap 2 and the angle of the ladder 4 cause the dead possum to rest on the base 3. As the base 3 tips down the dead possum drops out of the trap 2 in the direction of arrow A (FIG. 1) and into any suitably waiting receptacle (not shown).

Once the weight of the dead possum is removed from the base 3 the counterweight 10 returns the base 3 to its closed position.

The release mechanism for the base 3 has been described in combination with suitable electric circuitry. If so desired, other known purely mechanical timed release mechanisms may be used.

The time at which the counterweight 10 is released may vary, if so desired. It has been found in practice that allowing thirty seconds after electrocution is a convenient time.

The housing 7 may also provide a roof over the entire trap 2, if so desired. Obviously if the trap 2 is to be used in areas where heavy rain or snow falls, then a covering over the trap 2 is desirable as it cannot operate if filled with snow for extended periods.

In practice it has also been found that the trap operates most efficiently for possums if placed in an elevated position. This height may vary, but practically is between 1 to 2 meters. This permits the base 3 to operate and allows removal therefrom of dead animals, with maximum ease. A bag or other container (not shown) can be placed below the base 3, for collection of dead animals. This can be more easily dealt with on a periodic basis, than removal of dead animals from a pit or hole under the base 3. If the trap 2 is placed in an elevated position then access means (e.g. a ladder 13 or log) is placed at the front of the trap 2. A possum then enters the trap 2 in the direction of arrow C (FIG. 1).

With the base 3 operating in the manner described and with a battery or power source capable of repeatedly generating the necessary current a large number of animals can be trapped and killed without the need for manual supervision of the trap 2. A routine check to remove any dead animals, to check the food supply (or animal attractant) and to ensure the battery is adequately charged is all that is needed for the trap 2 to operate efficiently for an indefinite period.

Whilst the invention has been described with reference to the trapping and killing of possums, it will be appreciated that other animals can be dealt with in the same trap, with or without modification. Provided the animal desired to be trapped is capable of using its front paws or feet for raising the upper part of its body and has front feet or paws capable of contacting the ladder, then the above invention can be used to trap and kill such an animal. Thus the range of animals for which the invention can be used includes (but is not limited to) possums, rats, mice, martens, mink, weasels, musk-rats, raccoons, beavers and otters. Obviously, the dimensions and proportions of the trap may need to be varied to suit the size, weight and proportions of the species to be trapped.

What I claim is:

1. An animal trap which includes: a pivotable base capable of conducting an electric current, said trap being elevated to provide a space immediately below said base; a ladder at an angle above said base, said ladder being capable of conducting an electric current, but not electrically connected to said base; means to attract an animal to be trapped, located adjacent the top of said ladder; said base and said ladder being dimensioned and arranged such that an animal standing with its hind legs on said base and its front legs on said ladder can reach said attractant means; a power source capable of generating an electric current of sufficient strength to kill said animal, said electric current is passed through said ladder for a predetermined time and after a preselected period of time after the animal has touched said ladder; control means to cause said electric current to be transmitted through said ladder while said ladder and said base are being touched by said animal; said control means also allowing the base to pivot a predetermined time after said electric current has been transmitted through said ladder, so as to allow the body of the animal to fall into the space below the base.

2. An animal trap which includes: means to attract an animal to be trapped; a first component capable of conducting an electric current; a second component capable of conducting an electric current and not electrically connected to the first component, the second component being disposed at an angle relative to the first component; the first and second components both being capable of being contacted by the animal; control means to cause an electric current to be transmitted through one of the first or second components while being touched by the animal and with the other of the first or second components being earthed, as the electric current is passed through the second component for 30 seconds of predetermined time and after a pre-selected time period of 10 seconds after the animal has touched the second component, and a power source in the form of a 12 volt battery capable of generating the electric current.

3. An animal trap which includes: means to attract an animal to be trapped; a first component capable of conducting an electric current; a second component in the form of a metal ladder capable of conducting an electric current and not electrically connected to the first component, the second component being disposed at an acute angle within the 35° to 75° range relative to the first component, the first and second components each being capable of contact by the animal; control means to cause an electric current to be transmitted through one of the first or second components while being contacted by the animal with the other of the first or second components being earthed, as the electric current is passed through the second component for 30 seconds of predetermined time and after a pre-selected time period of 10 seconds after the animal has touched the second component, and a power source in the form of a 12 volt battery generating the electric current.

* * * * *